United States Patent

Fields, Jr. et al.

(10) Patent No.: US 9,507,650 B2
(45) Date of Patent: Nov. 29, 2016

(54) POWER EFFICIENT CALLBACK PATTERNS

(75) Inventors: M. David Fields, Jr., Kirkland, WA (US); Cenk Ergan, Bellevue, WA (US); Qiang Chen, Sammamish, WA (US); Michael D. Decker, Bellevue, WA (US); Kedar Sanjeev Hirve, Kent, WA (US); Walter V. von Koch, Seattle, WA (US); Jason J. Weber, Medina, WA (US); Katerina V. Sedova, Seattle, WA (US); Karen Elizabeth Parker Anderson, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 601 days.

(21) Appl. No.: 13/229,630

(22) Filed: Sep. 9, 2011

(65) Prior Publication Data

US 2013/0067489 A1    Mar. 14, 2013

(51) Int. Cl.
  *G06F 13/00*   (2006.01)
  *G06F 9/54*    (2006.01)

(52) U.S. Cl.
  CPC ......... *G06F 9/542* (2013.01); *G06F 2209/543* (2013.01); *G06F 2209/548* (2013.01)

(58) Field of Classification Search
  None
  See application file for complete search history.

(56) References Cited

U.S. PATENT DOCUMENTS

| | | | |
|---|---|---|---|
| 7,480,862 B2 * | 1/2009 | Cowden et al. | 715/700 |
| 8,271,996 B1 * | 9/2012 | Gould et al. | 719/312 |
| 8,335,982 B1 * | 12/2012 | Colton et al. | 715/234 |
| 2002/0010803 A1 * | 1/2002 | Oberstein et al. | 709/318 |
| 2005/0063335 A1 * | 3/2005 | Shenfield et al. | 370/329 |
| 2005/0278729 A1 * | 12/2005 | Lamkin et al. | 719/328 |
| 2006/0235970 A1 * | 10/2006 | Bateman et al. | 709/225 |
| 2008/0163258 A1 * | 7/2008 | Balasubramanian | 719/318 |
| 2009/0241092 A1 * | 9/2009 | Yang et al. | 717/115 |
| 2009/0327775 A1 | 12/2009 | Hamilton, II et al. | |
| 2010/0250440 A1 | 9/2010 | Wang et al. | |

OTHER PUBLICATIONS

Adfm, "Yielding with JavaScript Timers", May 17, 2010, pp. 1-8.*
Rant, "Web Reflection", Jul. 11, 2011, pp. 1-6.*
Gstreamer, "GetDataQueue: GStreamer 1.0 Library Reference Manual", Jan. 13, 2007, pp. 1-4.*
Zakas, "Script yielding with setImmediate | NCZOnline", Sep. 19, 2011, pp. 1-5.*
Zakas, Script yielding with setImmediate—NCZonline, Sep. 19, 2011, pp. 1-5.*

(Continued)

*Primary Examiner* — H S Sough
*Assistant Examiner* — Phuong N Hoang
(74) *Attorney, Agent, or Firm* — Bryan Webster; Raghu Chinagudabha; Micky Minhas

(57) ABSTRACT

In one or more embodiments, an application program interface (API) is provided and enables an entity, such as an application, script, or other computing object to register to receive callbacks immediately and, without specifying a time constraint. In this approach, the API does not rely on a timer, such as a system timer. Rather, a non-timer based queue, such as a message queue-type approach is utilized. Specifically, callbacks that are registered through this API can be placed on the message queue and work associated with the registered callback can be performed through the normal course of processing messages and events in the message queue. Over time, such results in a callback pattern that allows an associated web browser and applications such as web applications to remain responsive, while increasing performance and power efficiencies.

20 Claims, 5 Drawing Sheets

(56) References Cited

OTHER PUBLICATIONS

"Internet Explorer 9 Release Candidate New Features Summary", Retrieved at <<http://msdn.microsoft.com/en-us/healthvault/bb962148.aspx>>, Retrieved Date: Aug. 30, 2011, pp. 7.

Mann, Jatinder, "The Year in Review: W3C Web Performance Working Group", Retrieved at <<http://searchlogger.net/news/cat/microsoft-official>>, Aug. 17, 2011, pp. 27.

Zhao, et al., "Energy-Aware Web Browsing in 3G Based Smartphones", Retrieved at <<http://www.cse.psu.edu/research/publications/tech-reports/2011/cse-11-008.pdf>>, Retrieved Date: Aug. 30, 2011, pp. 1-13.

Valdovinos, Dave, "How power-friendly is your software?", Retrieved at <<http://www.developerfusion.com/article/120970/how-powerfriendly-is-your-software/>>, Jun. 23, 2011, p. 1.

"Mobile Battery Life Solutions for Windows 7", Retrieved at <<http://www.google.co.in/url?sa=t&source=web&cd=6&sqi=2&ved=0CDkQFjAF&url=http://download.microsoft.com/download/7/E/7/7E7662CF-CBEA-470B-A97E-CE7CEOD98DC2/mobile_bat_Win7.docx&ei=cGpbTuOxOoinrAeAmtjDCg&usg=AFQjCNGknpl-kwwc_mkziSKjo9bOje_bMA>>, Jun. 23, 2009, pp. 88.

"Browser Power Consumption—Leading the Industry with Internet Explorer 9", Retrieved at <<http://blogs.msdn.com/b/ie/archive/2011/03/28/browser-power-consumption-leading-the-industry-with-internet-explorer-9.aspx>>, Published in Microsoft News by Oscar, Mar. 28, 2011, pp. 49.

"Inside Internet Explorer 9 Performance", Retrieved at <<http://channel9.msdn.com/events/PDC/PDC10/CD09>>, Oct. 29, 2010, pp. 3.

Weber, Jason, "A Closer Look at Internet Explorer 9 Hardware Acceleration Through Flying Images", Retrieved at <<http://blogs.msdn.com/b/ie/archive/2010/04/07/a-closer-look-at-internet-explorer-9-hardware-acceleration-through-flying-images.aspx>>, Apr. 7, 2010, pp. 33.

Weber, Jason, "Performance: Profiling how different web sites use browser subsystems", Retrieved at <<http://blogs.msdn.com/b/ie/archive/2010/08/30/performance-profiling-how-different-web-sites-use-browser-subsystems.aspx>>, Aug. 30, 2010, pp. 11.

Vonkoch, Walter, "Measuring Browser Performance with the Windows Performance Tools", Retrieved at <<http://blogs.msdn.com/b/ie/archive/2010/06/21/measuring-browser-performance-with-the-windows-performance-tools.aspx>>, Jun. 21, 2010, pp. 14.

* cited by examiner

POWER EFFICIENT CALLBACK PATTERNS

BACKGROUND

Web platform and scripting programming models can tend to be power inefficient. Specifically, over the last few years, as browser manufacturers have attempted to increase callback frequencies, power requirements have actually increased. Power consumption can be a complex problem. There are many factors that contribute to challenging power consumption scenarios including how efficiently computation is batched, power state, sleep duration, and heat dissipation among others.

By increasing callback frequencies so that callbacks occur more quickly, power efficiency is reduced. Developers typically increase callback frequencies by specifying, when registering for callbacks, time values that are very low, e.g., between 0-4 ms. Specifically, by specifying small callback intervals or values and thus having callbacks occur at a quicker rate, more CPU cycles are utilized. Relatedly, there tends to not be adequate time between these rapid, specified callbacks for system components to meaningfully enter into a sleep or idle mode to conserve energy.

SUMMARY

This Summary is provided to introduce a selection of concepts in a simplified form that are further described below in the Detailed Description. This Summary is not intended to identify key features or essential features of the claimed subject matter.

In one or more embodiments, an application program interface (API) is provided and enables an entity, such as an application, script, or other computing object to register to receive callbacks immediately and, without specifying a time constraint. In this approach, the API does not rely on a timer, such as a system timer. Rather, a non-timer based queue, such as a scheduler or message queue-type approach is utilized. Specifically, callbacks that are registered through this API can be placed on the scheduler or message queue and work associated with the registered callback can be performed through the normal course of processing messages and events in the queue. Over time, such results in a callback pattern that allows an associated web browser and applications such as web applications to remain responsive, while increasing performance and power efficiencies.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

Figure 1:
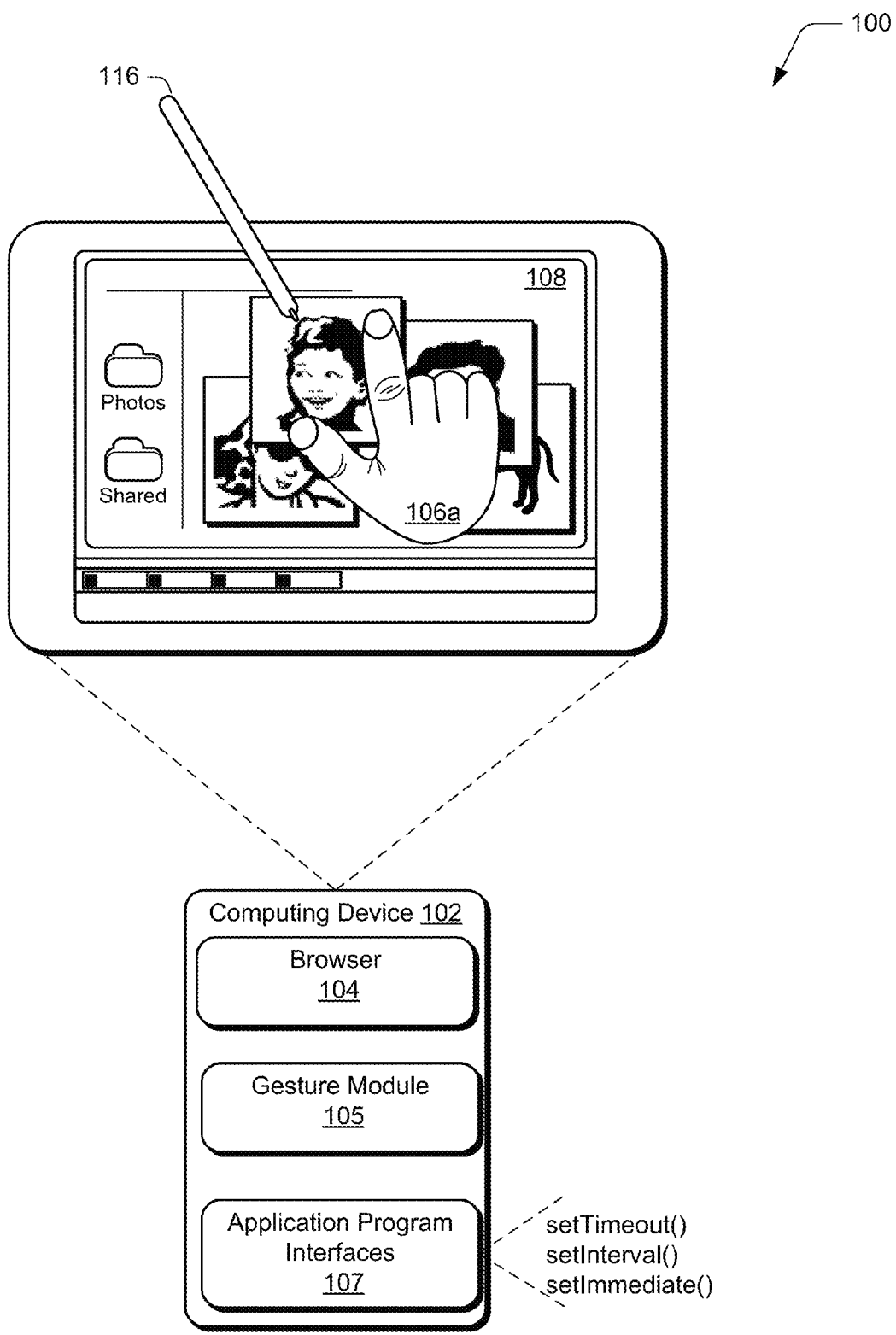
FIG. 1 is an illustration of an environment in an example implementation in accordance with one or more embodiments.

In one or more embodiments, an application program interface (API) is provided and enables an entity, such as an application, script, or other computing object to register to receive callbacks immediately and, without specifying a time constraint. In this approach, the API does not rely on a timer, such as a system timer. Rather, a non-timer-based queue, such as a scheduler or message queue-type approach is utilized. Specifically, callbacks that are registered through this API can be placed on the scheduler or message queue and work associated with the registered callback can be performed through the normal course of processing messages and events in the queue. Over time, such results in a callback pattern that allows an associated web browser and applications such as web applications to remain responsive, while increasing performance and power efficiencies.

As noted above, device power efficiency is a concern for those who develop software and hardware products. Having a power-inefficient device can lead to a degraded user experience and loss of consumer interest in a particular device or product.

Accordingly, to improve power consumption, some operating systems throttle their internal timer frequency, thus allowing the CPU to sleep for longer durations, which improves power consumption. For example, in some programming systems, an application can request callbacks at a specified frequency. For example, an application may request callbacks every 100 ms in which case the operating system will send notifications 10 times per second to the application. By default, some operating systems throttle the minimum callback frequency to 15.6 ms, which works out to 64 callbacks a second. When an application requests a higher frequency (more regular callbacks) these request are increased to 15.6 ms.

At these frequencies the x86/x64 processors can, by default, enter extremely lower power states over 99% of the time before a hardware interrupt occurs which, in turn, triggers the pending timer notifications.

Many web platforms, i.e. web browsers, have traditionally used a polling-based programming model where, the more often callbacks occur, the faster an application such as a web application may execute. To improve performance, browser manufacturers are beginning to disable the power management features in the underlying operating system. In the case of Microsoft Windows® operating systems, Windows® provides an API that allows a trusted native application to lower the 15.6 ms system wide throttle. This approach is, however, not recommended because it prevents the CPU from entering the lowest power states.

For example, reducing this throttle from 15.6 ms to the HTML5 recommended 4 ms reduces battery life by 22% on reference hardware which served as a study model. The increased frequency prevents the CPU from entering lower power states and conserving power. Toggling low power states on many architectures can cause a spike in power consumption during the transition, meaning the fewer transitions the better.

Once a single application has removed the system wide throttle provided by an operating system, the power savings are effectively gone because the associated hardware is prevented from efficiently sleeping.

Because of these underlying web patterns, browsers and web based applications can be extremely power inefficient, and in the process of trying to improve browser performance, browser manufacturers are actually causing the entire operating system and hardware to be more power inefficient.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

Example Environment

FIG. 1 is an illustration of an environment 100 in an example implementation that is operable to employ power efficient callback patterns described in this document. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes a web browser 104 to provide functionality as described in this document. The web browser can be implemented in connection with any suitable type of hardware, software, firmware or combination thereof. In at least some embodiments, the web browser is implemented in software that resides on some type of tangible, computer-readable storage medium examples of which are provided below.

Web browser 104 is representative of functionality that enables the user to browse to different web of sites and consume content associated with those websites.

Computing device 102 can also include a gesture module 105 that recognizes gestures that can be performed by one or more fingers, and causes operations to be performed that correspond to the gestures. The gestures may be recognized by module 105 in a variety of different ways. For example, the gesture module 105 may be configured to recognize a touch input, such as a finger of a user's hand 106a as proximal to display device 108 of the computing device 102 using touchscreen functionality. Module 105 can be utilized to recognize single-finger gestures and bezel gestures, multiple-finger/same-hand gestures and bezel gestures, and/or multiple-finger/different-hand gestures and bezel gestures.

The computing device 102 may also be configured to detect and differentiate between a touch input (e.g., provided by one or more fingers of the user's hand 106a) and a stylus input (e.g., provided by a stylus 116). The differentiation may be performed in a variety of ways, such as by detecting an amount of the display device 108 that is contacted by the finger of the user's hand 106 versus an amount of the display device 108 that is contacted by the stylus 116.

Thus, the gesture module 105 may support a variety of different gesture techniques through recognition and leverage of a division between stylus and touch inputs, as well as different types of touch inputs.

In addition, the computing device 102 includes a plurality of Application Program Interfaces (APIs) 107 that can be used to register for callbacks as will be described below. In this particular example, the APIs include a setTimeout( ) method, a setInterval( ) method, and a setImmediate( ) method.

The setTimeout( ) method calls a function or evaluates an expression after a specified number of milliseconds. This method can be used by code, such as JavaScript, to specify a time at which a callback is desired. Many web pages use the setTimeout( ) method with a specified period of zero to attempt to yield control flow to the user agent before running script. Specifically, this interface is often used to both allow user agent events and display updates to happen before continuing script execution and to avoid long running script dialogs in certain user agents. However, as will be appreciated by the skilled artisan, setTimeout( ) enforces a minimum delay, even with a specified period of zero, that is not uniformly implemented across user agents. Removing this minimum delay from setTimeout( ), as noted above, runs the risk of causing existing webpages, that have come to rely on the minimum delay, to break by going into a seemingly hung state while also significantly increasing the power consumption of the browser.

The setInterval( ) method calls a function or evaluates an expression at specified intervals (in milliseconds). The setInterval( ) method will continue calling the function until it is cleared, or an associated window is closed.

In one or more embodiments, the setImmediate( ) method runs a callback function immediately after the user agent events and display updates have occurred. This interface will not enforce a minimum delay and will attempt to run the callback as soon as it can. The setImmediate( ) method or API enables an entity, such as an application, script, or other computing object to register to receive callbacks immediately and, without specifying a time constraint. In this approach, the API does not rely on a timer, such as a system timer. Rather, a non-timer based queue, such as a scheduler or message queue-type approach is utilized. Specifically, callbacks that are registered through this API can be placed on the scheduler or message queue and work associated with the registered callback can be performed through the normal course of processing messages and events in the queue. Over time, such results in a callback pattern that allows an associated web browser and applications such as web applications to remain responsive, while increasing performance and power efficiencies. It is to be appreciated and understood that implementation of callbacks using the setImmediate( ) method can be performed by, and using any suitable entity. For example, this document refers to use of a scheduler or message queue. Other systems, however, refer to entities that can perform scheduling activities as a "dispatcher", "dispatch loop", or "message loop", to name just a few. Accordingly, these entities and others can be utilized to implement the embodiments described herein without departing from the spirit and scope of the claimed subject matter.

Figure 2:
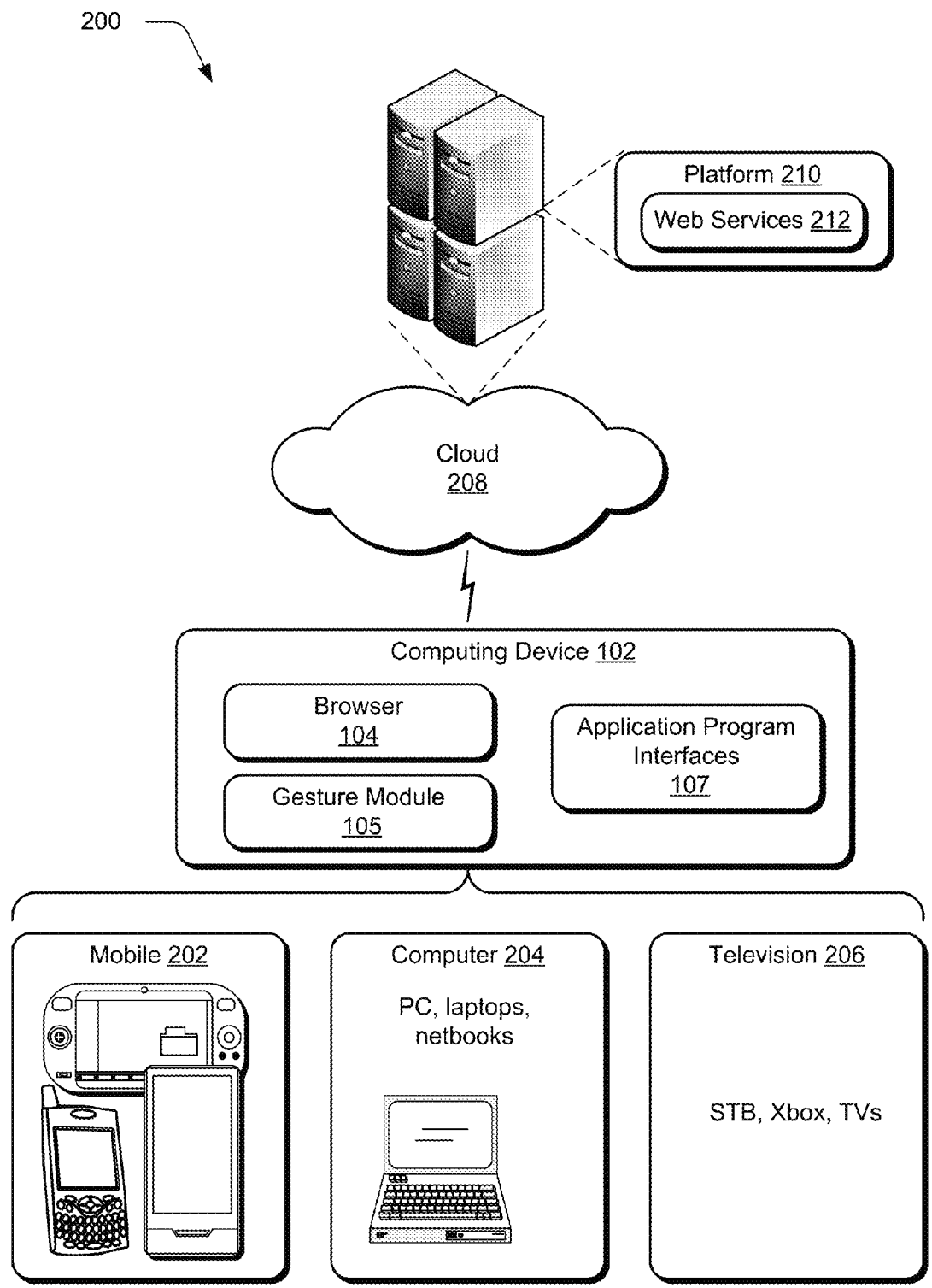
FIG. 2 is an illustration of a system in an example implementation showing FIG. 1 in greater detail.

FIG. 2 illustrates an example system 200 showing the browser 104, gesture module 105, and APIs 107 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks.

The gesture techniques supported by the gesture module may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe example embodiments. A section entitled "Setting Immediate Callbacks" describes how callbacks can be set in accordance with one or more embodiments. Next, a section entitled "Interleaving Timers" describes how timers can be interleaved in accordance with one or more embodiments. Following this, a section entitled "Example Method" describes an example method in accordance with one or more embodiments. Last, a section entitled "Example Device" describes aspects of an example device that can be utilized to implement one or more embodiments.

Having described example operating environments in which the inventive techniques can be utilized, consider now a discussion of one or more embodiments in which callbacks can be set for immediate callback.

Setting Immediate Callbacks

As noted above, the setImmediate( ) method can be utilized to run a callback function immediately after the user agent events and display updates have occurred. This interface does not enforce a minimum delay and will attempt to run the callback as soon as it can. Consider the following Javascript example to illustrate a web-based e-mail client attempting to do a spellcheck operation after the user agent events and display updates have been flushed, to ensure that the site remains responsive:

```
<!DOCTYPE html>
    <html>
        <head>
            <script>
                function emailClient( ) {
                    // Do email work
                    // When UI is free, check for spelling
                    setTimeout(checkSpelling, 0);
                }
                function checkSpelling( ) {
                    // Scan email for spelling errors
                }
            </script>
        </head>
        <body onload="emailClient( )">
        </body>
    </html>
```

Note here that the setTimeout( ) method is used to callback the function checkSpelling. Here, however, the script callback will be subject to a minimum delay that may not be uniformly defined across user agents. This results in script that is not running in the most performant manner.

Using the setImmediate( ) method, the page will be able to efficiently yield control flow without minimum delays. As an example, consider the following JavaScript which shows a web-based e-mail client attempting to do a spellcheck operation with the setImmediate( ) method to efficiently yield control flow without minimum delays:

```
<!DOCTYPE html>
    <html>
        <head>
```

-continued

```
<script>
    function emailClient( ) {
        // Do email work
        // When UI is free, check for spelling
        setImmediate(checkSpelling);
    }
    function checkSpelling( ) {
        // Scan email for spelling errors
    }
</script>
</head>
<body onload="emailClient( )">
</body>
</html>
```

The setImmediate( ) method can execute callbacks more efficiently because it does not rely on a timer-based queue or a system timer. Recall that timer-based approaches, such as setTimeout( ) and setInterval( ), can still be subject to minimum delays imposed by the system. In this example, the setImmediate( ) method utilizes a non-timer-based queue in the form of a scheduler or message queue.

Example setImmediate( ) API

Figure 3:
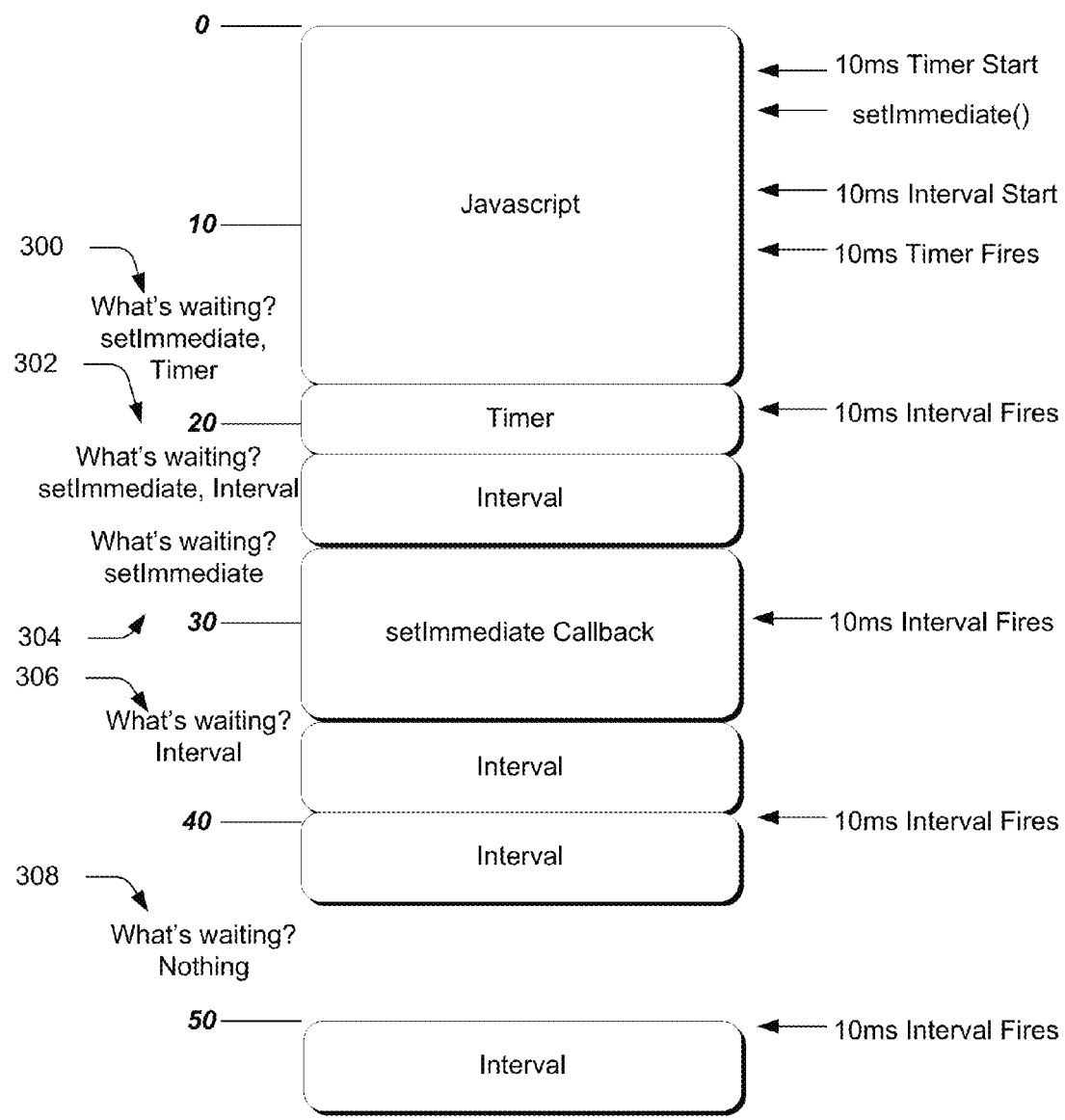
FIG. 3 is a diagram that illustrates one aspect of an immediate callback in accordance with one or more embodiments.

To understand how control can be yielded to setImmediate( ) callbacks without the system's minimum delays, consider the FIG. 3 diagram which represents a simplified diagram that illustrates how setImmediate( ) callbacks can be processed, along with callback processing associated with the setTimeout( ) and setInterval( ) methods( ), in accordance with one or more embodiments.

Typically, since JavaScript in a browser executes on a single thread, asynchronous events such as mouse clicks, keyboard inputs, immediate callbacks (e.g., setImmediate( ) callbacks), and the like, are run when there is an opening in the execution. This is perhaps best demonstrated by the FIG. 3 diagram.

In this diagram, time in milliseconds is shown to the left, e.g., 0 milliseconds, 10 milliseconds, 20 milliseconds, 30 milliseconds, 40 milliseconds, and 50 milliseconds. The various boxes represent portions of JavaScript being executed. For example, the first block of JavaScript executes for approximately 18 ms, the callback associated with the timer then blocks, and so on.

Because JavaScript executes one piece of code at a time, due to its single-threaded nature, each of these blocks of code are said to be "blocking" the progress of other asynchronous events. This means that when an asynchronous event occurs, such as a mouse click, a timer firing, and the like, it gets queued up to be executed later.

Initially, within the first block of JavaScript, two timers are initiated: a 10 ms setTimeout( ) (the first arrow down on the right) and a 10 ms setInterval ( ) (the third arrow down on the right). In addition, a setIntermediate ( ) callback is registered (the second arrow down on the right). Because of where and when the timer was started within the first block of code, it fires before the first block of code is complete (i.e. fourth arrow down on the right). Because of where it fired, it does not execute immediately and is incapable of doing so because of the threading. Instead, the delayed function is queued in order to be executed at the next available moment.

Additionally, the setImmediate( ) callback is unable to be executed immediately and thus, like the initial timer, it is queued to be executed later. After the initial block of JavaScript finishes at or around 18 ms, the browser immediately ascertains, at 300, whether anything is waiting for execution. In this case, the set immediate callback and the timer callback are waiting for execution. The browser then picks one and executes it immediately. In this case, the browser picks the timer callback and executes it immediately. The setImmediate will wait until the next possible time, in order to execute.

Note that while the timer callback is executing, the first interval callback fires (fifth arrow down on the right). As with the setImmediate( ), it is queued for later execution. When the timer callback finishes execution, the browser again ascertains, at 302, whether anything is waiting for execution. Here, the setImmediate and the first fired interval are waiting. The browser then executes the interval, thus leaving the setImmediate. At the end of the interval execution, the browser ascertains, at 304, whether anything is waiting for execution. Here, the setImmediate is waiting for execution and is therefore executed. During the setImmediate execution, the interval fires again (sixth arrow down), and accordingly, is queued up for execution. When setImmediate concludes, the browser ascertains, at 306, whether anything is waiting for execution. Here, the queued up interval is waiting and is therefore executed. At or near the end of the interval's execution, the interval fires again (seventh arrow down) and is less executed as shown. At the end of the third interval execution, the browser ascertains, at 308, whether anything is waiting for execution. Here, there is nothing waiting for execution so the browser now waits for a new asynchronous event to occur. This occurs at the 50 ms mark when the interval fires again and is thus executed immediately because nothing is blocking.

In various embodiments, the setImmediate( ) method does not utilize the system timer or timer queues, such as the setTimeout( ) and setInterval( ) methods. Rather, the setImmediate( ) utilizes a non-timer-based queue which, in this example, comprises a message queue. Any suitable type of message queue can be utilized. One example message queue is the Windows® message queue. Of course, as noted above, other entities can be utilized to implement this functionality without departing from the spirit and scope of the claimed subject matter.

In various systems, message queues and their equivalents can be used for such things as painting on the screen, processing input from a cursor, and the like. The setImmediate( ) method places the associated callback on the message queue of tasks to accomplish. If there is nothing on the message queue, the associated callback will be executed immediately. If there are other items on the message queue, in some embodiments, those can be processed prior to processing the associated callback that has been placed on the message queue. Thus, web developers can use the setImmediate( ) method to break apart long-running JavaScript operations and receive a call back immediately after the browser has processed outstanding work such as events and display refreshes.

As but one example of an implementation of the setImmediate( ) method, consider the following:

The following method can be exposed by any suitable object including, by way of example and not limitation, a Windows object. It is to be appreciated and understood, however, that implementation of the above- and below-described functionality can be performed in any suitable system utilizing any suitable object. In the specific context of a Windows-based system, consider the following method:

```
window.msSetImmediate(func)
function func( ) {
    // do work
}
```

This function is called and is provided with a parameter which is the callback that is to be used. This function can also take another form in which not only a callback can be provided, but arguments as well.

Interleaving Timers

Oftentimes, as in the example above, more than one timer can be utilized. In one or more embodiments, and in conjunction with the use of the setImmediate( ) function, timers can be ordered and interleaved with setImmediate( ). As an example, consider the following in which the order of funcA, funcB, and funcC being called up depends on how long it takes for the loop to complete.

```
setTimeout(funcA, 5);
setImmediate(funcC);
setTimeout(funcB, 10);
for (var i = 0; i < 100000000000; i++);
```

Here, there are two timeout functions, one scheduled for 5 ms and the other scheduled for 10 ms. If this loop takes greater than 10 ms, the order of calls made will be funcA, funcC, funcB, as due timers are fired prior to setImmediates. If, on the other hand, the loop takes less than 5 ms, the order of calls made will be funcC, funcA, funcB since available CPU time can be efficiently utilized.

Having considered example interfaces that can be used to specify callbacks in accordance with one or more embodiments, consider now an example method in accordance with one or more embodiments.

Example Method

Figure 4:
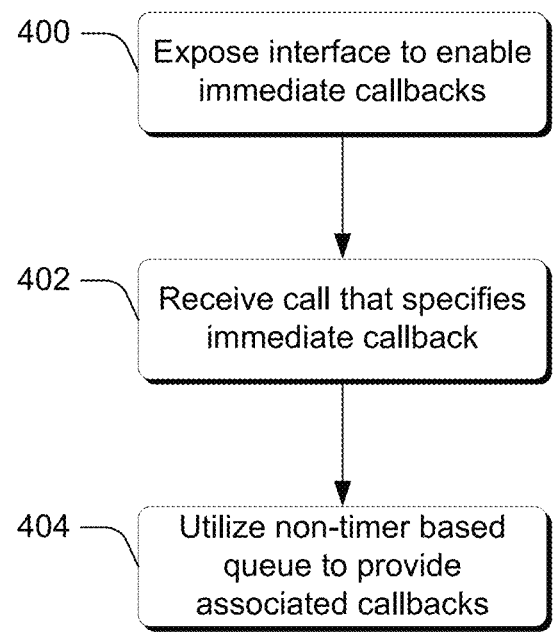
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware, or combination thereof. In particular, the method can be implemented in connection with any system in which callbacks are typically utilized. Such systems can include, by way of example and not limitation, browser systems and environments in which JavaScript is employed. Such systems can further include, by way of example and not limitation, operating systems, mobile devices, application environments, and any other suitable form of software system.

Step 400 exposes an interface to enable immediate callbacks. This step can be performed in any suitable way. For example, this step can expose an interface that allows an entity such as an application, script, object, and the like to specify that desires to receive callbacks immediately. In the illustrated and described embodiment, specification of immediate callbacks can occur without specifying a numerical time value at which such callbacks are desired to be received.

Step 402 receives, using the interface, a call that specifies that immediate callback is desired. Step can be performed in any suitable way, examples of which are provided above. Step 404 utilizes a non-timer-based queue to provide associated callbacks. Any suitable non-timer-based queue can be utilized. For example, in at least some embodiments, a scheduler or message queue can be utilized in order to provide associated callbacks. But one example of how this can be done is provided above.

Having described various embodiments in which power efficient callback patterns can be utilized, consider now an example device that can be utilized to implement one or more embodiments.

Example Device

Figure 5:
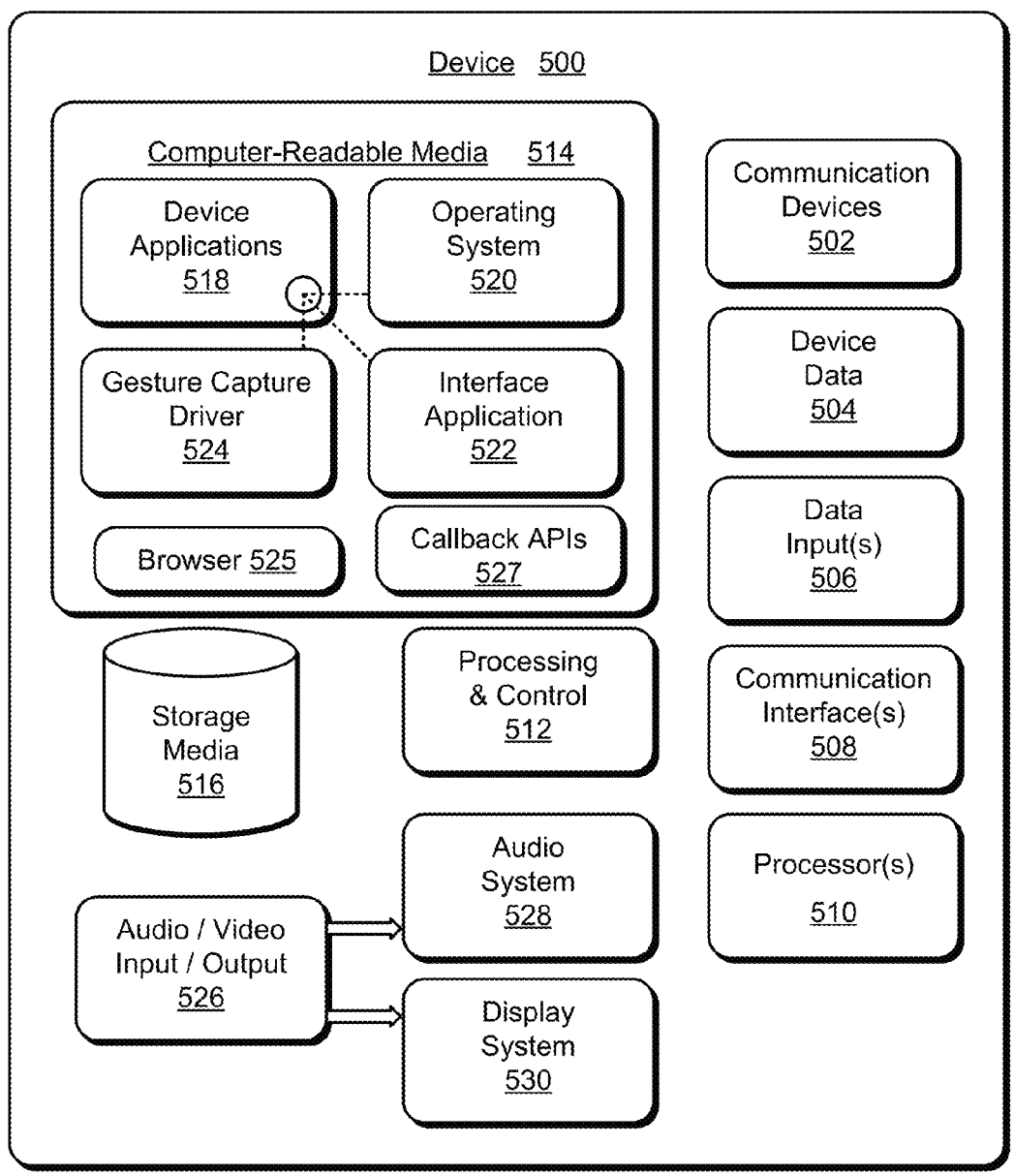
FIG. 5 illustrates an example computing device that can be utilized to implement various embodiments described herein.

FIG. 5 illustrates various components of an example device 500 that can be implemented as any type of portable and/or computer device as described with reference to FIGS. 1 and 2 to implement the embodiments described herein. Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable or readable instructions to control the operation of device 500 and to implement the embodiments described above. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 518 also include any system components or modules to implement embodiments of the techniques described herein. In this example, the device applications 518 include an interface application 522 and a gesture-capture driver 524 that are shown as software modules and/or computer applications. The gesture-capture driver 524 is representative of software that is used to provide an interface with a device configured to capture a gesture, such as a touchscreen, track pad, camera, and so on. Alternatively or in addition, the interface application 522 and the gesture-capture driver 524 can be implemented as hardware, software, firmware, or any combination thereof. In addition, computer readable media 514 can include a web browser 525 that functions as described above, as well as callback APIs 527 that function as described above.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

CONCLUSION

In the embodiments described above, an application program interface (API) is provided and enables an entity, such as an application, script, or other computing object to register to receive callbacks immediately and, without specifying a time constraint. In this approach, the API does not rely on a timer, such as a system timer. Rather, a non-timer based queue, such as a message queue-type approach is utilized. Specifically, callbacks that are registered through this API can be placed on the message queue and work associated with the registered callback can be performed through the normal course of processing messages and events in the message queue. Over time, such results in a callback pattern that allows an associated web browser and applications such as web applications to remain responsive, while increasing performance and power efficiencies.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method, implemented at computer system that includes one or more processors, for interleaving immediate callbacks with timer-based callbacks, the method comprising:

exposing a first application programming interface (API) to enable immediate callbacks in a client web platform;
exposing one or more second APIs to enable timer-based callbacks in the client web platform;
receiving, using the first API, a first call that specifies that an immediate callback to a specified function is desired;
queuing the immediate callback to the specified function in a non-timer-based queue;
subsequent to receiving the first call, receiving, using the one or more second APIs, one or more second calls that specify that one or more timed callbacks to one or more specified functions are desired after one or more time intervals;
prior to processing the immediate callback, identifying that the one or more time intervals have lapsed, and queuing the one or more timed callbacks in a timer-based queue based on the one or more timer intervals having lapsed; and
interleaving the non-timer-based queue and the timer-based queue so that all timed callbacks in the timer-based queue are processed before any immediate callback in the non-timer-based queue, including:
identifying that the one or more timed callbacks exist in the timer-based queue, and that the immediate callback also exists in the non-timer-based queue;
based on the one or more timed callbacks existing in the timer-based queue, processing the one or more timed callbacks instead of processing the immediate callback;
subsequent to processing the one or more timed callbacks, identifying that no timed callbacks exist in the timer-based queue, and that the immediate callback exists in the non-timer-based queue; and
based on no timed callbacks existing in the timer-based queue, processing the immediate callback.

2. The method of claim 1, wherein the non-timer-based queue comprises a message queue.

3. The method of claim 1, further comprising processing a display refresh prior to processing the non-timer-based queue.

4. The method of claim 1, wherein the immediate callback comprises a JavaScript callback.

5. The method of claim 1, wherein the immediate callback comprises a callback associated with browser execution.

6. The method of claim 1, wherein the immediate callback comprises a callback that is associated with other than browser execution.

7. One or more computer readable storage memories embodying computer executable instructions that are executable by one or more processors of a computer system to configure the computer system to interleave immediate callbacks with timer-based callbacks, the computer-executable instructions including instructions that are executable to configure the computer system to perform at least the following:

expose a first application programming interface (API) to enable immediate callbacks in a client web platform;
expose one or more second APIs to enable timer-based callbacks in the client web platform;
receive, using the first API, a first call that specifies that an immediate callback to a specified function is desired;
queue the immediate callback to the specified function in a non-timer-based queue;
subsequent to receiving the first call, receive, using the one or more second APIs, one or more second calls that specify that one or more timed callbacks to one or more specified functions are desired after one or more time intervals;

prior to processing the immediate callback, identify that the one or more time intervals have lapsed, and queue the one or more timed callbacks in a timer-based queue based on the one or more timer intervals having lapsed; and interleave the non-timer-based queue and the timer-based queue so that all timed callbacks in the timer-based queue are processed before any immediate callback in the non-timer-based queue, including:
- identifying that the one or more timed callbacks exist in the timer-based queue, and that the immediate callback also exists in the non-timer-based queue;
- based on the one or more timed callbacks existing in the timer-based queue, processing the one or more timed callbacks instead of processing the immediate callback;
- subsequent to processing the one or more timed callbacks, identifying that no timed callbacks exist in the timer-based queue, and that the immediate callback exists in the non-timer-based queue; and
- based on no timed callbacks existing in the timer-based queue, processing the immediate callback.

8. The one or more computer readable storage memories of claim 7, wherein the non-timer-based queue comprises a message queue.

9. The one or more computer readable storage memories of claim 7, the computer-executable instructions including instructions that are also executable to configure the computer system to process a display refresh prior to processing the non-timer-based queue.

10. The one or more computer readable storage memories of claim 7, wherein the immediate callback comprises a JavaScript callback.

11. The one or more computer readable storage memories of claim 7, wherein the immediate callback comprises a callback associated with browser execution.

12. The one or more computer readable storage memories of claim 7, wherein the immediate callback comprises a callback that is associated with other than browser execution.

13. A computer system, comprising:
one or more processors; and
one or more computer readable media having stored thereon computer-executable instructions that are executable by the one or more processors to configure the computer system to interleave immediate callbacks with timer-based callbacks, the computer-executable instructions including instructions that are executable to configure the computer system to perform at least the following:

expose a first application programming interface (API) to enable immediate callbacks in a client web platform;

expose one or more second APIs to enable timer-based callbacks in the client web platform;

receive, using the first API, a first call that specifies that an immediate callback to a specified function is desired;

queue the immediate callback to the specified function in a non-timer-based queue;

subsequent to receiving the first call, receive, using the one or more second APIs, one or more second calls that specify that one or more timed callbacks to one or more specified functions are desired after one or more time intervals;

prior to processing the immediate callback, identify that the one or more time intervals have lapsed, and queue the one or more timed callbacks in a timer-based queue based on the one or more timer intervals having lapsed; and interleave the non-timer-based queue and the timer-based queue so that all timed callbacks in the timer-based queue are processed before any immediate callback in the non-timer-based queue, including:
- identifying that the one or more timed callbacks exist in the timer-based queue, and that the immediate callback also exists in the non-timer-based queue;
- based on the one or more timed callbacks existing in the timer-based queue, processing the one or more timed callbacks instead of processing the immediate callback;
- subsequent to processing the one or more timed callbacks, identifying that no timed callbacks exist in the timer-based queue, and that the immediate callback exists in the non-timer-based queue; and
- based on no timed callbacks existing in the timer-based queue, processing the immediate callback.

14. The computer system of claim 13, wherein the non-timer-based queue comprises a message queue.

15. The computer system of claim 13, the computer-executable instructions including instructions that are also executable to configure the computer system to process a display refresh prior to processing the non-timer-based queue.

16. The computer system of claim 13, wherein the immediate callback comprises a JavaScript callback.

17. The computer system of claim 13, wherein the immediate callback comprises a callback associated with browser execution.

18. The computer system of claim 13, wherein the immediate callback comprises a callback that is associated with other than browser execution.

19. The computer system of claim 13, wherein the first API comprises a setImmediate function.

20. The computer system of claim 13, wherein the non-timer-based queue comprises a scheduler queue.

* * * * *